United States Patent

Kobayashi et al.

[11] 4,032,812
[45] June 28, 1977

[54] FLUORESCENT HIGH-PRESSURE MERCURY-VAPOR LAMP

[75] Inventors: Yoshichika Kobayashi, Ibaraki; Hidezoh Akutsu, Ashiya; Katsuaki Iwama, Suita, all of Japan

[73] Assignee: Matsushita Electronics Corporation, Osaka, Japan

[22] Filed: Feb. 17, 1976

[21] Appl. No.: 658,375

[30] Foreign Application Priority Data

Feb. 19, 1975 Japan .............................. 50-21216

[52] U.S. Cl. .............................. 313/487; 313/486; 313/225; 313/227
[51] Int. Cl.² ...................................... H01J 61/12
[58] Field of Search ........... 313/487, 486, 227, 225

[56] References Cited
UNITED STATES PATENTS

3,866,083   2/1975   Datta et al. .................. 313/487

*Primary Examiner*—Rudolph V. Rolinec
*Assistant Examiner*—Darwin R. Hostetter

*Attorney, Agent, or Firm*—Burgess, Ryan and Wayne

[57] ABSTRACT

The present invention disclosed the phosphor coating for fluorescent high-pressure mercury-vapor lamps, consisting of a red light emitting phosphor with the following composition

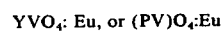

$$YVO_4 : Eu, \text{ or } (PV)O_4 : Eu$$

and a blue-green light emitting phosphor with the following composition

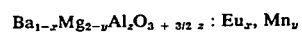

$$Ba_{1-x}Mg_{2-y}Al_zO_{3+3/2\,z} : Eu_x, Mn_y$$

where $0.03 \leq x \leq 0.4$, $0.01 \leq y \leq 0.6$, and $12 \leq z \leq 20$, a highly satisfactory color rendition may be attained, and the color temperature may be arbitrarily changed so that the mercury-vapor lamps in accordance with the present invention are best adapted for use in interior lighting in offices, lobbies, shops and so on.

3 Claims, 8 Drawing Figures

FLUORESCENT HIGH-PRESSURE MERCURY-VAPOR LAMP

BACKGROUND OF THE INVENTION

The present invention relates to a novel fluorescent high-pressure mercury-vapor lamp (to be referred as "mercury-vapor lamp" in this specification) which provides excellent color rendition and whose color temperature may be arbitrarily varied. More particularly the invention relates to the composition of the phosphor coating applied over the inner surface of the outer tube of a mercury-vapor lamp.

With the conventional mercury-vapor lamps for exterior lighting consisting of an arc tube and a transparent outer tube, the yellow-green light emitted is dominant and the lighting appears unnatural. The yellow-green light is dominant since the spectral energy distribution of the mercury emission does not extend over the wavelength of 579 nm. In addition a discontinuity in the mercury emission spectrum exists between 436 and 546 nm; that is, in the blue-green region. The defect, due to the former reason, has been remedied by the use of a phosphor coating applied over the inner surface of the outer tube of the mercury-vapor lamp which is capable of converting the mercury emission into a red light emission. The red light emitting phosphors used for this purpose are, for instance, $YVO_4$: Eu, $YV_{0.5}P_{0.5}O_4$: Eu. However, a discontinuity still exists between 436 and 546 nm; that is, light produced by the mercury-vapor lamp lacks blue-green light. The red light is dominant so that satisfactory interior lighting with a desired color rendition cannot be attained.

SUMMARY OF THE INVENTION

Object of the present invention is to provide a novel mercury-vapor lamp in which the composition of the phosphor coating applied over the inner surface of the outer tube is so selected that the mercury-vapor lamp may be used as a light source for interior lighting.

The present invention provides a mercury-vapor lamp of the type comprising an arc tube capable of emission of both visible and ultraviolet light, an outer tube enclosing said arc tube, and a phosphor coating applied over the inner surface of said outer tube consisting of two kinds of phosphors, characterized in that one of said two phosphors emits red light and consists of europium-activated yttrium-vanadate or europium-activated yttrium-vanadate-phosphate; and the other phosphor emits blue-green light and consists of bivalent europium-and manganese-activated barium-magnesium-aluminate having the following formula where $0.03 \leq x \leq 0.4$, $0.01 \leq y \leq 0.6$, and $12 \leq z \leq 20$.

DESCRIPTION OF THE PREFERRED EMBODIMENT

Figure 1:
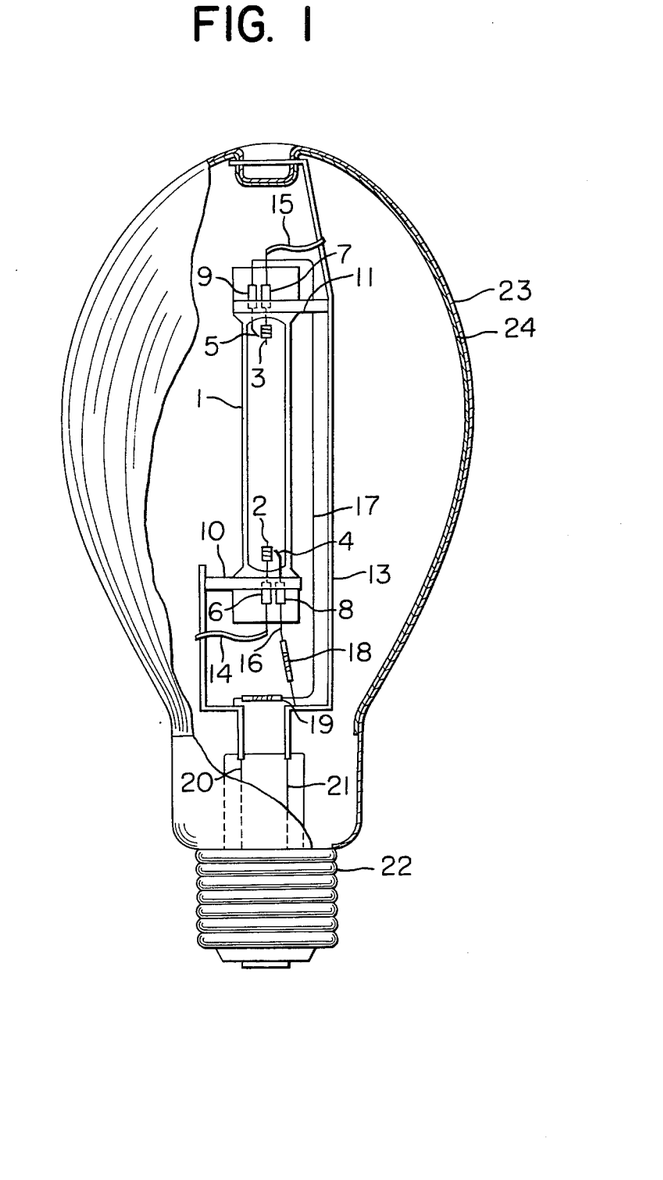
FIG. 1 is a front view, partly broken, of a mercury-vapor lamp in accordance with the present invention.

Referring to FIG. 1 showing the construction of a high-pressure mercury-vapor lamp in accordance with the present invention, within an arc tube 1 made of a transparent material are sealed a lower main electrode 2 and an upper main electrode 3, both of which are made of coiled tungsten wires, and auxiliary or starting electrodes 4 and 5. In addition, the arc tube 1 is filled with a suitable amount of mercury and a small amount of an inert gas such as argon gas for starting the arc tube 1. The arc tube 1 is supported by tube supports 10 and 11 which in turn are supported by stem wires or supporting leads 12 and 13. The main electrodes 2 and 3 are electrically connected through molybdenum foils 6 and 7 embedded in the sealed ends of the arc tube 1 and lead-in wires 14 and 15 to the stem wires or supporting leads 12 and 13. The auxiliary or starting electrodes 4 and 5 are electrically connected through molybdenum foils 8 and 9 embedded in the sealed ends of the arc tube 1, lead-in wires 16 and 17, and starting resistors 18 and 19 to the stem wires or supporting leads 13 and 12, respectively. The stem wires or supporting leads 12 and 13 are electrically connected to a base 22 through lead-in wires 20 and 21, respectively. The arc tube 1 is enclosed within an outer tube 23 which is made of a hard glass and filled with an inert gas such as nitrogen and whose inner wall is coated with a phosphor 24.

The inventors made the over-all and detailed comparisons between the spectral energy distribution of the arc tube and the spectral energy distributions of various phosphors coated over the inner surface of the outer tube 23, and discovered that when, in addition to the conventional phosphor producing red light, the novel phosphors capable of producing blue-green light, between the wavelengths of 436 and 546 nm, and capable of arbitrarily varying luminance intensity are coated on the inner wall surface of the outer tube, the desired color rendition may be obtained at desired color temperatures. The blue-green light emitting phosphors are in general expressed by the following formula:

wherein
$x = 0.03$ to $0.4$,

$y = 0.01$ to $0.6$, and
$12 \leq x \leq 20$.

By changing $x$ and $y$, the ratio between the color temperature with the peak wavelength of 450 nm due to the presence of $Eu^{2+}$ and the color temperature with the peak wavelength of 515 nm due to the presence of $Mn^{2+}$ may be varied so that the tone of blue-green light may be suitably changed. The phosphors in accordance with the present invention have excellent temperature characteristics and luminance efficiency. The inventors used the combinations of the conventional red light emitting phosphors with the blue-green light emitting phosphors with $x$ and $y$ within the above ranges in the high-pressure mercury-vapor lamps, and succeeded in obtaining the color rendition with the color temperature between 3500° and 10000° K, which color rendition has been hitherto unattainable by the conventional mercury-vapor lamps.

The phosphor coating 24 chosen consists of a red light emitting phosphor having the formula Y(PV)O$_4$: Eu or YVO$_4$: Eu and a blue-green light emitting phosphor having the formula Ba$_{1-x}$Mg$_{2-y}$Al$_z$O$_{3 + 3/2z}$: Eu$_x$, MN$_y$ where
$x = 0.03$ to $0.4$,
$y = 0.01$ to $0.6$, and
$12 \leq z \leq 20$.

Figure 2:
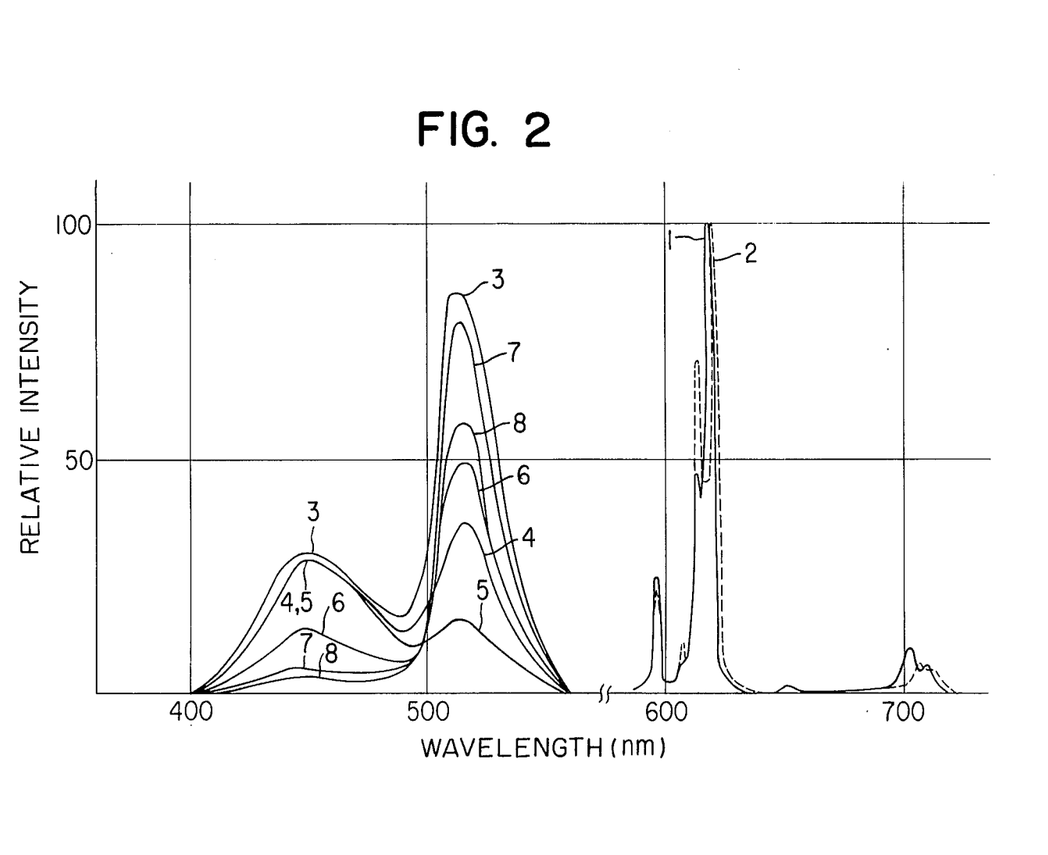
FIG. 2 shows the spectral energy distributions of some phosphors excited by the 365 nm characteristic line of the mercury emission spectrum.

The spectral energy distributions of some typical examples of the phosphor coatings with the above composition are shown in FIG. 2, the phosphor coatings being excited by the 365 nm characteristic line of the mercury emission spectrum. In FIG. 2, curve 1 is for a phosphor coating with the composition Y$_{0.95}$V$_{0.5}$P$_{0.5}$O$_4$: Eu$_{0.05}$;

curve 2, for a coating with the composition

Y$_{0.95}$VO$_4$: Eu$_{0.05}$;

curve 3, for a coating with the composition

Ba$_{0.8}$Mg$_{1.9}$Al$_{14}$O$_{24}$: Eu$_{0.2}$Mn$_{0.1}$;

curve 4, for a coating with the composition

Ba$_{0.8}$Mg$_{1.95}$Al$_{14}$O$_{27}$: Eu$_{0.2}$Mn$_{0.05}$;

curve 5, for a coating with the composition

Ba$_{0.8}$Mg$_{1.98}$Al$_{14}$O$_{24}$: Eu$_{0.2}$Mn$_{0.02}$;

curve 6, for a coating with the composition

Ba$_{0.8}$Mg$_{1.9}$Al$_{14}$O$_{24}$: Eu$_{0.1}$Mn$_{0.2}$;

curve 7, for a coating with the composition

Ba$_{0.8}$Mg$_{1.4}$Al$_{14}$O$_{24}$: Eu$_{0.1}$Mn$_{0.6}$;

curve 8, for a coating with the composition

Figure 3:
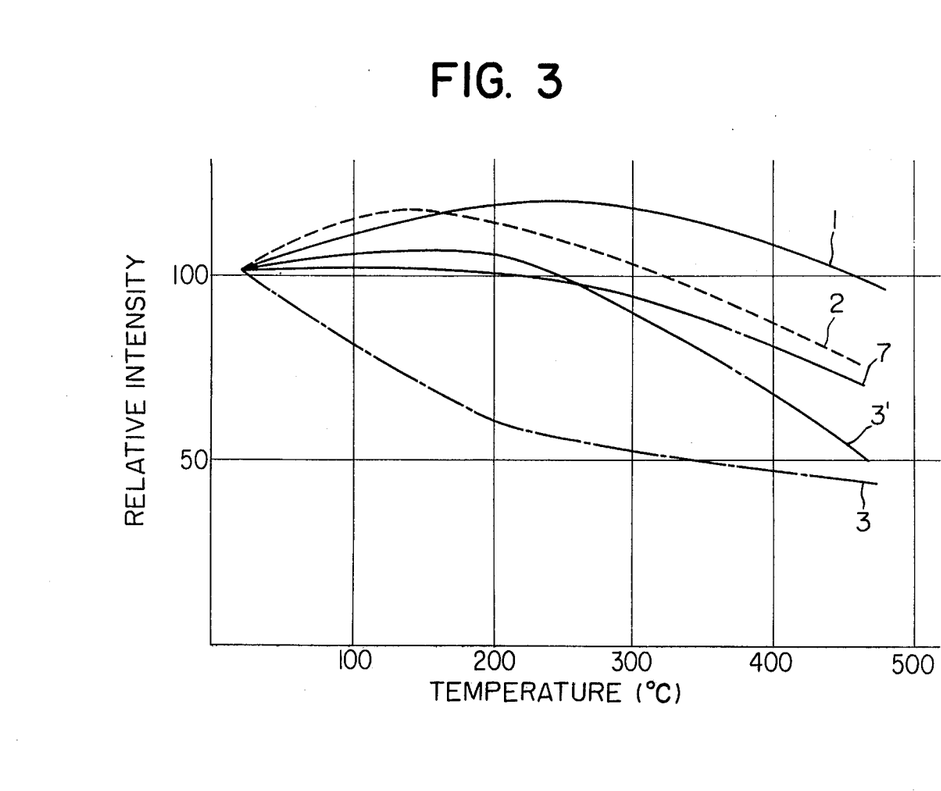
FIG. 3 shows the temperature characteristics excited by the 365 nm characteristic line of the mercury emission spectrum.

Ba$_{0.95}$Mg$_{1.4}$Al$_{14}$O$_{24}$: Eu$_{0.05}$Mn$_{0.6}$;

The temperature characteristics of these phosphor coatings are shown in FIG. 3, in which curve 1 is for a phosphor coating with

Y$_{0.95}$P$_{0.5}$V$_{0.5}$O$_4$: Eu$_{0.05}$;

curve 2, for a coating with

Y$_{0.95}$VO$_4$: Eu$_{0.05}$;

curve 3, for a coating with

Ba$_{0.8}$Mg$_{1.9}$Al$_{14}$O$_{24}$: Eu$_{0.2}$Mn$_{0.1}$;

the emission of light with the wavelength of 450 nm is due to the presence of $Eu^{2+}$;
the curve 3', for the coating with the same composition, the emission of light of the wavelength 515 nm being due to the presence of $Mn^{2+}$, and
curve 7, for a coating with the composition Ba$_{0.8}$Mg$_{1.4}$Al$_{14}$O$_{27}$: Eu$_{0.1}$Mn$_{0.6}$ emitting the light with the wavelength of 515 nm. The surface temperature of the outer tube during operation ranges between 200° and 300° C. From FIG. 3, it is readily seen that the temperature characteristics of light with the wavelengths of 450 nm and 515 nm due to the presence of $Eu_2^+$ and $Mn^{2+}$, respectively, are different. Even though the intensity is of the same order at normal temperature, the dominant light is green at high temperatures.

When $y = 0$ in the blue-green light emitting phosphor with the formula of

Ba$_{1-x}$Mg$_{2-y}$Al$_z$O$_{(3 + 3/2z)}$: Eu$_x$ Mn$_y$ only light with the wavelength of 450 nm is emitted, but when $x = 0.1$ and $y = 0.6$, the dominant emission is green light with the peak wavelength of 515 nm. When the above two phosphors are mixed with the vanadate phosphor which produces red light, the color rendition similar to that attained by the present invention may be obtained.

Figure 4:
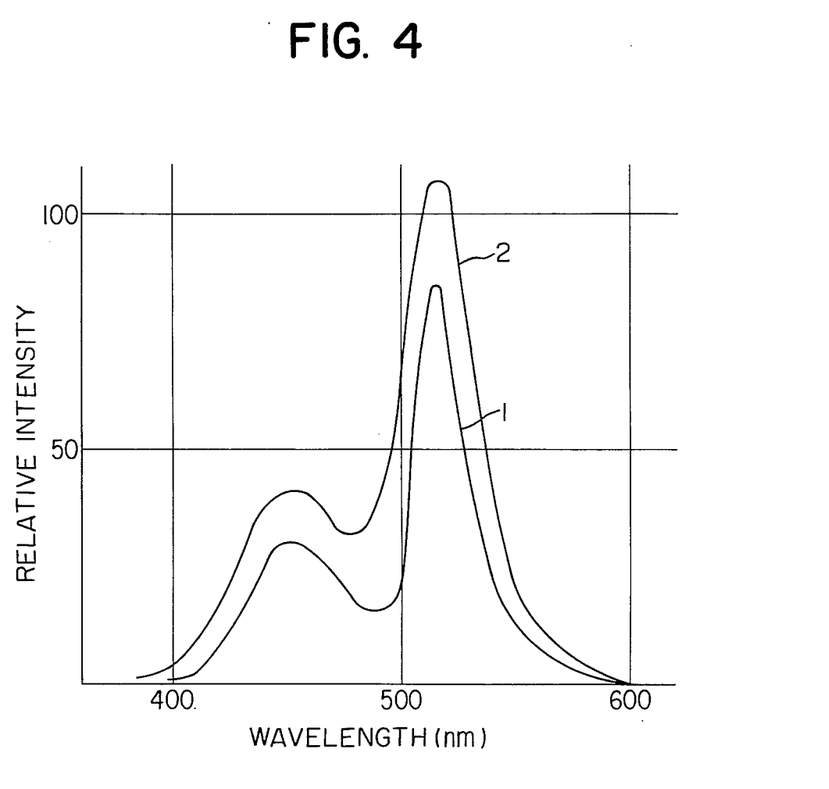
FIG. 4 is a graph used for the explanation of the luminous efficiency comparison between a blend of two blue-green light emitting phosphors in accordance with the present invention and a single blue-green light emitting phosphor in accordance with the present invention, the luminous intensity being measured at 300° C.

However the extensive studies and experiments conducted by the inventors shows that the light emission efficiency may be increased by 20 to 30% when only the blue-green light emitting phosphor is used instead of being mixed individually. In FIG. 4, curve 1 is for a phosphor coating in which the phosphor with the composition of Ba$_{0.9}$Mg$_2$Al$_{14}$O$_{24}$: Eu$_{0.1}$ and a phosphor with the composition of Ba$_{0.8}$Mg$_{1.4}$Al$_{14}$O$_{24}$: Eu$_{0.2}$ Mn$_{0.6}$ are mixed in the ratio of 1: 2; and curve 2, for a phosphor with the composition Ba$_{0.8}$Mg$_{1.93}$Al$_{14}$O$_{24}$: Eu$_{0.2}$Mn$_{0.07}$ Both the curves 1 and 2 indicate the spectral energy distributions at 300° C. From FIG. 4, it is seen that when the content of the red light emitting phosphor in the coating is constant, the blue-green light is more dominant. When the content of the blue-green light emitting phosphor is constant, the red light may be made more dominant. From the standpoint of quality control, it is more advantageous to mix and apply two kinds of phosphors than three kinds of phosphors since the number of different phosphors produced can be minimized.

Figure 5:
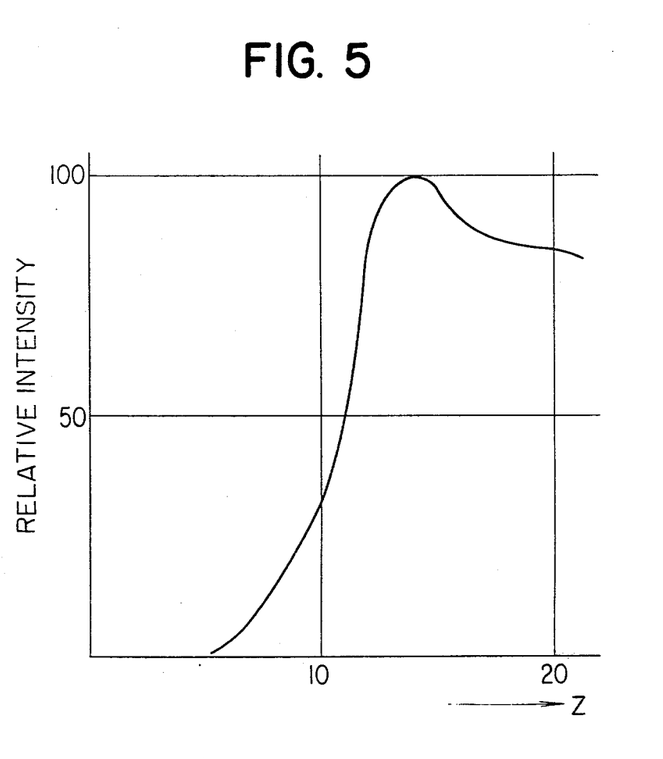
FIG. 5 is a graph used in the explanation of the effect of the amount of aluminum in the blue-green light emitting phosphor in accordance with the present invention on the luminous intensity.
Figure 6:
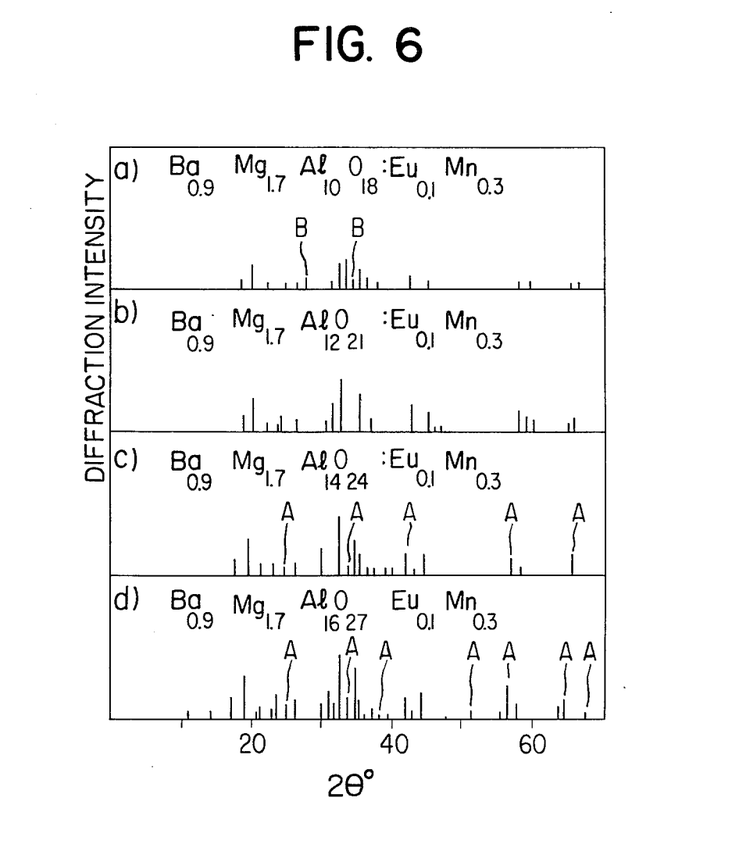
FIG. 6 shows schematic X-ray diffraction (fluorescence analysis) diagrams of the blue-green light emitting phosphors with the varied aluminum content.

With the phosphor of the formula $Ba_{1-x}Mg_{2-y}Al_zO_{3+3/2z}:Eu_xMn_y$, the inventors made extensive experiments by changing the factor z, and found that with higher z, the stronger the intensity of luminance and that when $z = 14$, the intensity reaches the peak as shown in FIG. 5. As shown in FIG. 6, the X-ray diffraction analyses shows that when $z = 12$, the phosphor has a single phase, that when z is greater than 12 the phosphor includes an $\alpha$-Al$_2$O$_3$ phase and when z is smaller than 12, a BaAl$_2$O$_4$ phase appears. Therefore from the standpoint of the intensity and X-ray diffraction analysis, the optimum range of z is between 12 and 20 and more preferably between 12 and 16.

Figure 7:
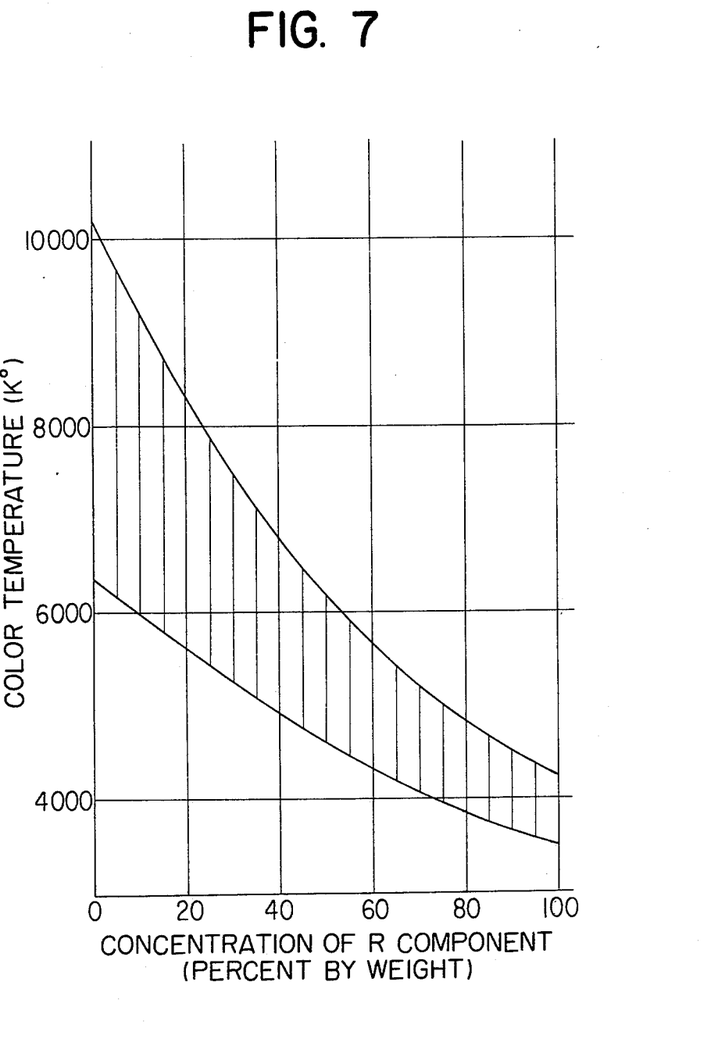
FIG. 7 is a graph illustrating the relationship between the content percent by weight of a red light emitting phosphor in the phosphor coating and the color temperature.

In view of the above, the inventors considered that the desired color rendition may be attained with the desired color temperatures when the spectral energy distributions of the above phosphors and the spectral energy distribution for the arc tube are suitably balanced. Therefore, the inventors provided mercury-vapor lamps in which the ratio between the red light emitting phosphor and the blue-green light emitting phosphor is varied in order to investigate the resulting color temperature and color rendition. The result was that satisfactory color rendition may be obtained within the color temperature range shown in FIG. 7 when the content R, % by weight of the red light emitting phosphor is within the following range:

$$20 \leq R \leq 95,$$

and the blue-green light emitting phosphor has the following formula:

$Ba_{1-x}Mg_{2-y}Al_zO_{3+3/2z}:Eu_xMn_y$ where
$x = 0.03$ to $0.4$,
$y = 0.01$ to $0.6$, and
$12 \leq z \leq 20$
and the phosphor coating is applied over the inner surface of the outer tube at a rate of 0.3 to 6 mg/cm². Thus the present invention can provide the novel high-pressure mercury-vapor lamps with excellent light emission characteristics hitherto unattainable by the conventional mercury-vapor lamps. In FIG. 7, curve 1 is for a phosphor coating consisting of the red light emitting phosphor and blue-green light emitting phosphor with the composition of $Ba_{0.8}Mg_{1.99}Al_{14}O_{24}:Eu_{0.2}Mn_{0.01}$ and curve 2, for a coating consisting of the red light emitting phosphor and a blue-green light emitting phosphor with the composition of $Ba_{0.8}Mg_{1.4}Al_{14}O_{24}:Eu_{0.1}Mn_{0.6}$ The color temperature of the mercury-vapor lamp in accordance with the present invention may be arbitrarily varied between 3500° and 10000° K. For interior lighting the color temperature is preferably between 3500° and 6500° K and R is greater than 20% by weight. For office illumination, R is preferably greater than 40% so that the color temperature may be low. In general, the phosphor coating is applied over the inner surface of the outer tube at the rate between 0.8 and 1.5 mg/cm². In some cases, in order to make the light emission from the phosphor coating more dominant than the characteristic lines of the mercury emission spectrum, the rate may be between 3 and 4 mg/cm². However, a rate higher than 6 mg/cm² must be avoided because the phosphor coating is difficult and the cost is high.

Next some examples of the present invention will be described.

EXAMPLE 1

Figure 8:
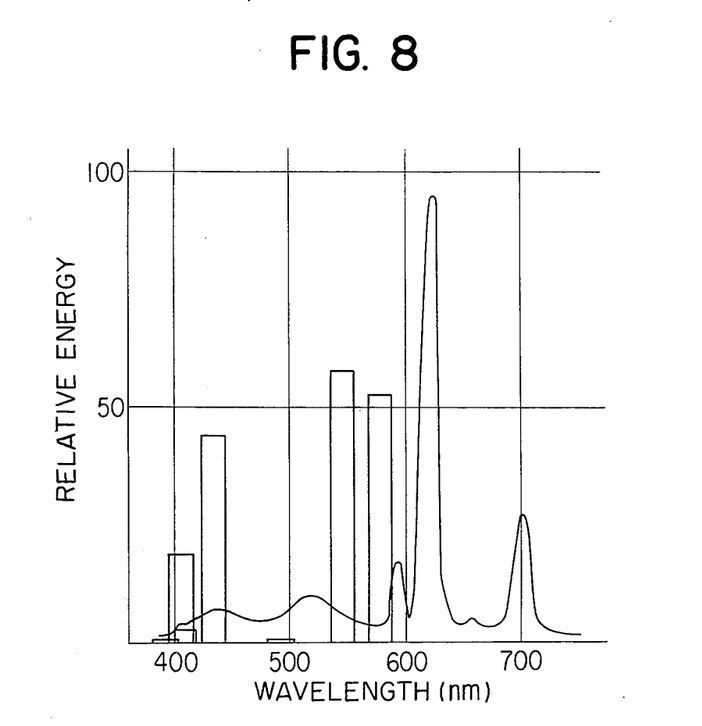
FIG. 8 shows the spectral energy distribution for a mercury-vapor lamp having the phosphor coating in accordance with the present invention.

A red light emitting phosphor with the following composition $Y_{0.95}P_{0.5}V_{0.5}O_4:Eu_{0.05}$ and the blue-green light emitting phosphor with the following composition $Ba_{0.8}Mg_{1.93}Al_{14}O_{24}:Eu_{0.2}Mn_{0.07}$ were mixed with the weight ratio of 75 : 25. 200 g of such phosphor mixture was mixed with 250 cc (cm₃) of 1% -nitrocellulosebutyl acetate solution. The mixture was applied to the inner surface of the outer tube of the mercury-vapor lamp with the rating of 100 W, dried and baked for 15 minutes at 450° C. The thickness of the phosphor coating was 1.5 mg/cm². The luminous flux of the mercury-vapor lamp thus obtained was 4700 lumens; the color temperature was 4500° K; and the average color rendering index was 55. The spectral energy distribution for this lamp is shown in FIG. 8.

EXAMPLE 2

The phosphor coating was applied to the outer tube of a 400W mercury-vapor lamp substantially in the same manner as described in EXAMPLE 1. The luminous flux was 25000 lumens; the color temperature was 4200° K; and the average color rendering index was 60.

EXAMPLE 3

A red light emitting phosphor with the following composition $Y_{0.95}VO_4:Eu_{0.05}$ and the blue-green light emitting phosphor with the following composition $Ba_{0.8}Mg_{1.95}Al_{16}O_{27}:Eu_{0.2}Mn_{0.05}$ were mixed at the ratio of 65 : 35, and applied to outer tube of a 400 W mercury-vapor lamp at the rate of 3 mg/cm² substantially in the same manner as described in EXAMPLE 1. The luminous flux was 24000 lumens; the color temperature was 4500° K; and the average color rendering index was 52.

EXAMPLE 4

A red light emitting phosphor with the following composition $Y_{0.95}P_{0.5}V_{0.5}O_4:Eu_{0.05}$ and the blue-green light emitting phosphor with the following composition $Ba_{0.9}Mg_{1.5}Al_{12}O_{21}:Eu_{0.1}Mn_{0.5}$ were mixed at the weight ratio of 40 : 60, and applied to the outer tube of a 400 W mercury-vapor lamp, following the procedures of EXAMPLE 1, at the rate of 1 mg/cm². The luminous flux was 25500 lumens; the color temperature was 5500° K; and the average color rendering index was 47.

What is claimed is:

1. A high-pressure mercury-vapor lamp of the type comprising an arc tube capable of the emission of both visible and ultraviolet light, an outer tube enclosing said arc tube, and a phosphor coating applied over the inner surface of said outer tube and consisting essentially of two kinds of phosphors, characterized in that one of said two phosphors is a red light emitting phosphor selected from the group consisting of europium-activated yttrium-vanadate and
   europium-activated yttrium-vanadate-phosphate; and the other phosphor emits blue-green light and consists of
   bivalent europium- and manganese-activated barium-magnesium-aluminate having the following formula $$Ba_{1-x}Mg_{2-y}Al_zO_{3+3/2z}:Eu_xMn_y$$

where $0.03 \leq x \leq 0.4$, $0.01 \leq y \leq 0.6$ and $12 < z < 20$.

2. A high-pressure mercury-vapor lamp as set forth in claim 1 wherein $$12 \leq z \leq 16.$$

3. A high-pressure mercury-vapor lamp as set forth in claim 1 wherein
   the concentration by weight of said red light emitting phosphor in said coating is in the range of 20 to 95 percent.

* * * * *

UNITED STATES PATENT OFFICE
CERTIFICATE OF CORRECTION

Patent No. 4,032,812                    Dated     June 28, 1977

Inventor(s)    Yoshichika Kobayashi, et al

It is certified that error appears in the above-identified patent and that said Letters Patent are hereby corrected as shown below:

In the Title Page, under "Inventors": The name and address of the fourth inventor has been omitted; the information should read -- Masayuki Yamaguchi, Osaka-fu, Japan --.

Column 4, lines 1, 6 & 9: After "with" insert --the composition--.

Column 4, line 11: "$A_{14}$" should be --$Al_{14}$--.

Column 5, line 64: "3500°" should read -- 3500°K abd--.

Column 5, line 66: "3500°" should read -- 3500°K --.

Column 6, line 25: "($cm_3$) should read --($cm^3$) --.

Signed and Sealed this

Tenth Day of January 1978

[SEAL]

Attest:

RUTH C. MASON
Attesting Officer

LUTRELLE F. PARKER
Acting Commissioner of Patents and Trademarks